United States Patent [19]

Smeltzer et al.

[11] Patent Number: 4,504,317
[45] Date of Patent: Mar. 12, 1985

[54] ENCAPSULATION OF BORIC ACID SLURRIES

[75] Inventors: Eugene E. Smeltzer, Export; Yoshio Ichikawa, Pittsburgh; George N. Schneider, Jr., North Huntingdon, all of Pa.

[73] Assignee: Westinghouse Electric Corp., Pittsburgh, Pa.

[21] Appl. No.: 472,526

[22] Filed: Mar. 7, 1983

[51] Int. Cl.³ .............................................. C04B 7/35
[52] U.S. Cl. ...................................... 106/90; 106/97; 252/631
[58] Field of Search ............................ 106/89, 90, 97; 252/628, 631

[56] References Cited

U.S. PATENT DOCUMENTS

| | | | |
|---|---|---|---|
| 3,507,801 | 4/1970 | Krausz et al. | 252/631 |
| 3,947,283 | 3/1976 | Uchikawa et al. | 106/89 |
| 3,988,258 | 10/1976 | Curtiss et al. | 252/128 |
| 4,116,705 | 9/1978 | Chappell | 106/90 |
| 4,122,028 | 10/1978 | Iffland et al. | 252/631 |
| 4,139,488 | 2/1979 | Knotik et al. | 106/97 |
| 4,209,335 | 6/1980 | Katayama et al. | 106/97 |
| 4,226,631 | 10/1980 | Kubota | 106/97 |
| 4,274,880 | 6/1981 | Chappell | 106/90 |
| 4,379,081 | 4/1983 | Rootham et al. | 106/97 |

Primary Examiner—James Poer
Attorney, Agent, or Firm—R. D. Fuerle

[57] ABSTRACT

Disclosed is a process for encapsulating in cement a boric acid slurry which is at least about 30% boric acid. To the sulrry is added about 3.5 to about 4.5% dispersing agent, about 0.02 to about 0.03 ml/g of a cement retarder, up to about 0.4% of a hardener, and sufficient cement to bring the weight ratio of water to cement to about 0.4 to about 0.6. Also disclosed is a cement composition produced by said method.

11 Claims, 2 Drawing Figures

ENCAPSULATION OF BORIC ACID SLURRIES

BACKGROUND OF THE INVENTION

In the primary loop of pressurized water reactors (PWR), an aqueous solution of boric acid is used to absorb neutrons, which converts their kinetic energy into heat. From time to time this boric acid solution must be removed and disposed of because it becomes contaminated and may corrode the equipment or leave deposits in the tubing. Once the boric acid solution leaves the reactor it is evaporated and vacuum cooled in a crystallization process to reduce the volume of liquid that must be handled. Some of the boric acid precipitates, producing a slurry which may contain up to about 70 wt. % boric acid plus various radioactive and non-radioactive contaminants that may have entered the water.

The Nuclear Regulartory Commission (NRC) requires that low level radioactive waste, such as this boric acid solution, be converted into a free standing monolith for transportation and disposition. It has been the practice in the industry to convert the slurry into a solid monolith by adding cement to it. However, if the boric acid concentration in the slurry is greater than about 30% by weight the cement very rapidly assumes a false set, a thickening and hardening which is not due to the curing of the cement. The false set makes it virtually impossible to move the mixture through pipes, as is normally done in filling containers used for disposal.

SUMMARY OF THE INVENTION

We have discovered that if a cement retarder and a dispersing agent are added to the boric acid slurry, the false set does not occur and the slurry containing the cement can be worked for about 30 minutes. Surprisingly, even though the hardening is retarded, the final product nevertheless has a greater penetration resistance.

Our invention utilizes readily available and inexpensive materials and does not require additional expensive equipment. The method of this invention is safe and easily implemented using equipment already available.

RELEVENT ART

U.S. Pat. No. 4,122,028 discloses a process for the solidification of radioactive solutions and suspensions of low borate concentrations by sequential addition of slaked lime and cement to form solid, transportable blocks.

U.S. Pat. No. 3,507,801 discloses the treatment of radioactive waste water mixed with a sodium borate solution. Bonding in Portland cement is described as the ultimate storage processing.

U.S. Pat. No. 3,988,258 discloses the incorporation of radwaste using a cement-type binding agent to which alkali or alkaline earth silicate is added.

DESCRIPTION OF THE INVENTION

Figure 1:
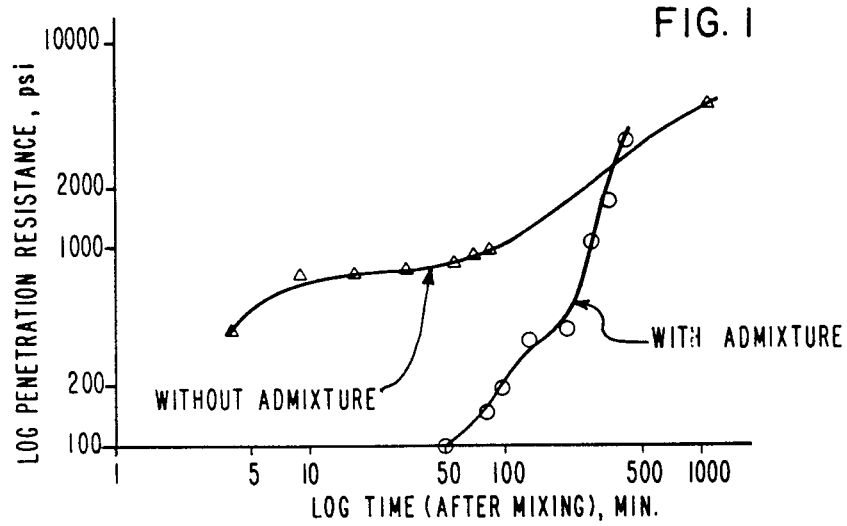
FIG. 1 is a graph of time versus the log of the penetation resistance of two boric acid solutions encapsulated in cement, one prepared according to this invention and one not prepared according to this invention. The experiment is described in Example 1.

The slurry to be encapsulated in the process of this invention may contain about 30 to about 70% (all percentages herein are by weight unless otherwise indicated) boric acid, the remainder being water and small amounts of radioactive contaminants such as cobalt, cesium, strontium, and radionuclides, as well as non-radioactive contaminants such as iron oxides and other corrosion products.

It is necessary to add a dispersing agent to the boric acid slurry. A dispersing agent is a compound which breaks up any aggregates which may be present and disperses them in order to produce a better mix and reduce the power needed to thoroughtly mix the cement into the boric acid slurry. Suitable dispersing agents include the potassium salt of polymerized alkyl naphthalene sulfuric acids, modified lignosulfates, and polyethylene glycol 400 monostearate. The preferred dispersing agent is the sodium sulfonate of a naphthalene-formaldehyde condensation product because it was found to work best. The dispersing agent should constitute about 3.5 to about 4.5% of the weight of the cement.

It is also necessary to add a cement retarder to the boric acid slurry. Cement retarders are well known compounds which retard or slow the set time of the cement. Suitable cement retarders include polyvinyl alcohols, calcium lignosulfates, sodium lignosulfates, and sulfonated naphthalene. The preferred cement retarder is a sodium lignosulfate because it retarded setting to a greater extent that other retarders. The cement retarder should be present at about 0.02 ml to about 0.03 ml per gram of cement because less is ineffective, and more has no additional effect and is wasted.

While it is preferably not present as it is usually not worth the trouble of adding it, a hardener may be present to increase the strength of the final product. Suitable hardeners include calcium chloride, metallic salts of hydroxylated carboxylic acids, and sodium citrate. The preferred hardener is sodium citrate because it was found to work best. The hardener may be added in an amount up to about 0.4% (based on the weight of the cement) as more is of no additional benefit.

Finally, cement is added to the mixture and is thoroughly mixed in. Sufficient cement should be added so that the weight ratio of the water present in the slurry to cement should be about 0.4 to about 0.6. Portland cement, particulary type 1, type 2, type 4, or mixtures thereof, works particularly well in this invention. After the cement has been mixed in, the mixture is permitted to set or is poured into molds for setting. Hardening typically requires about 3 to about 5 hours.

The following examples further illustrate this invention.

EXAMPLE 1

All of the parametric testing with the admixtures was conducted in 16 oz. glass jars using a small motor-driven impeller for mixing. Previous testing showed good correlation, on a relative basis, betwen the results obtained in the jar tests and the full scale, high shear mixer tests, and this was the basis for this series of tests. When the best mixture was identified in the jar tests, a mix was completed in the full scale, high shear mixer, with the adition of simulated PWR contaminants for leach testing. The following table gives the weights or volumes used for the final mixtures. The full scale test was based on a ⅓ drum volume mix (68 l), but other volumes are also possible on a directly proportional basis. For both tests, the starting mixture was at room temperature and a 5 minute time, after the addition of the last component, was used.

| Component | For Jar Test | For Full Scale Mixer Test (68l) |
|---|---|---|
| Water | 96 g | 20.5 kg |
| Boric Acid - $H_{BO_3}$ (Nuclear Grade Granular) | 204 g | 45.5 kg |
| A proprietary retarder sold by Master Builders under the trade designation "Pozzolith 100XR" retarder, believed to be a sodium lignosulfate | 4 ml | 854.9 ml |
| Type I Portland Cement | 192 g | 41.1 kg |
| A sulfonated naphthalene sold by Stepan Chemical Co. under the trade designation "Stepantan A" Dispersant | 7.68 g | 1.64 kg |
| Sodium citrate | 0.6 g | 123.3 g |
| Simulated PWR Contaminants | | |
| Trisodium Phosphate | — | 134 g |
| Motor Oil | — | 134 g |
| $Co(NO_3)_2 \cdot 6H_2O$ | — | 330 g |
| CsCl | — | 85 g |
| $Sr(NO_3)_2$ | — | 162 g |

A comparison of the penetration resistance of the product from a full scale mixer test, without and with cement admixtures is given in the accompanying drawing. The experiments show that a longer work time is achieved, as well as greater penertration resistance in approximately the same time.

EXAMPLE 2

Figure 2:
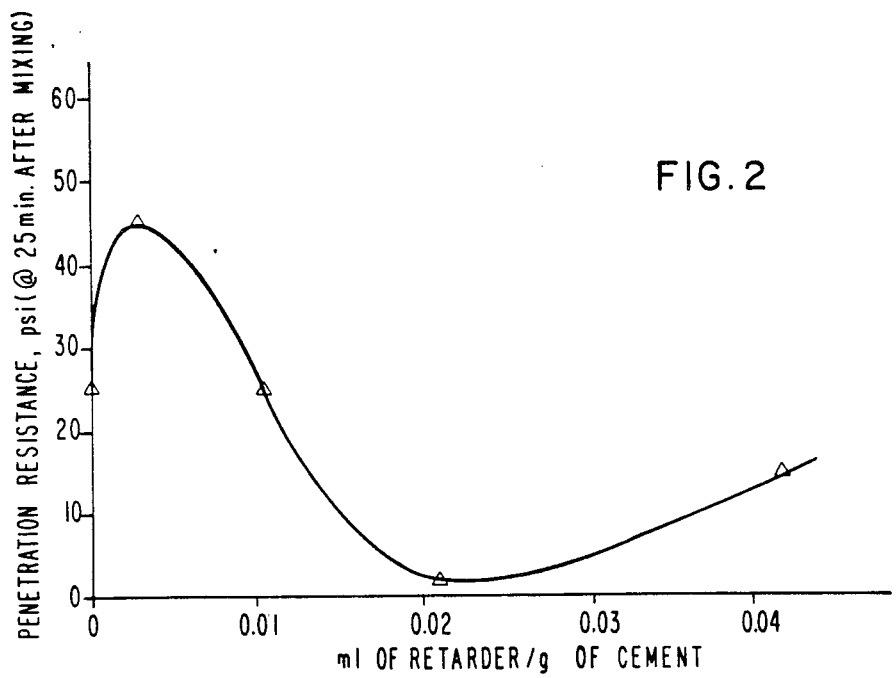
FIG. 2 is a graph showing the relationship between penetration resistence and retarder content of a cement prepared according to the invention, and described in Example 2.

The effect of the retarder addition on the penetration resistance is shown in FIG. 2, at 25 minutes after mixing. After very low additions it appears to speed up the set. After reaching a minimum at about 0.02 ml of retarder/g of cement, it again starts to speed up the set. This illustrates the first series of parametric test for the retarder addition to determine the optimum amount. Similar parametric tests were also run for the other variables.

We claim:

1. A process for encapsulating in cement a slurry of about 30 to about 70% boric acid in water, comprising adding to said slurry:
   (a) about 3.5 to about 4.5% as a dispersing agent, based on the weight of said cement;
   (b) about 0.02 to about 0.03 ml of a retarder per gram of a cement;
   (c) up to about 0.4% of a hardener, based on the weight of said cement; and
   (d) sufficient cement for a weight ratio of water to cement of about 0.04 to about 0.6.

2. A process according to claim 1 wherein said dispersing agent is the sodium sulfonate of a naphthalene-formaldehyde condensation product.

3. A process according to claim 1 wherein said cement retarder is a sodium lignosulfate.

4. A process according to claim 1 wherein said hardener is sodium citrate.

5. A proces according to claim 1 wherein said cement is Portland cement.

6. A process according to claim 1 wherein said boric acid slurry includes radioactive contaminants.

7. A cement composition comprising:
   (a) a slurry of about 30 to about 70% boric acid and about 30 to about 70% water;
   (b) sufficient cement for a weight ratio of said water to said cement of about 0.4 to about 0.6;
   (c) about 3.5 to about 4.5% dispersing agent based on the weight of said cement;
   (d) about 0.02 to about 0.03 ml of a cement retarder per gram of said cement; and
   (e) up to about 0.4% of a hardener, based on the weight of said cement.

8. A composition according to claim 7 wherein said dispersing agent is the sodium sulfonate of a naphthalene-formaldehyde condensation product.

9. A composition according to claim 7 wherein said cement retarder is a sodium lignosulfate.

10. A composition according to claim 7 wherein said hardener is sodium citrate.

11. A composition according to claim 7 wherein said cement is Portland cement.

* * * * *